US010310564B2

(12) United States Patent
Park, Jr. et al.

(10) Patent No.: US 10,310,564 B2
(45) Date of Patent: Jun. 4, 2019

(54) LINKING MECHANISM FOR A COMPUTING DEVICE WITH A ROTATABLE DISPLAY MEMBER

(71) Applicant: HEWLETT-PACKARD DEVELOPMENT COMPANY, L.P., Houston, TX (US)

(72) Inventors: Chan Park, Jr., Houston, TX (US); Wen-Yo Lu, Houston, TX (US); Chad Patrick Paris, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 3 days.

(21) Appl. No.: 15/308,993

(22) PCT Filed: Jun. 30, 2014

(86) PCT No.: PCT/US2014/044868
§ 371 (c)(1),
(2) Date: Nov. 4, 2016

(87) PCT Pub. No.: WO2016/003411
PCT Pub. Date: Jan. 7, 2016

(65) Prior Publication Data
US 2018/0188781 A1    Jul. 5, 2018

(51) Int. Cl.
*G06F 1/16*    (2006.01)
*F16M 13/00*    (2006.01)
*E05D 7/082*    (2006.01)

(52) U.S. Cl.
CPC .......... *G06F 1/1681* (2013.01); *E05D 7/082* (2013.01); *G06F 1/1616* (2013.01);
(Continued)

(58) Field of Classification Search
None
See application file for complete search history.

(56) References Cited

U.S. PATENT DOCUMENTS 5,666,694 A * 9/1997 Slow ............... G06F 1/1618
16/308
5,781,406 A   7/1998 Hunte
(Continued)

FOREIGN PATENT DOCUMENTS

| CN | 1627229 | 6/2005 |
| CN | 103576772 | 2/2014 |
| CN | 103823518 | 5/2014 |

OTHER PUBLICATIONS

David LeClair, "Acer's Ezel hinge system debuts in Aspire R7," May 6, 2013, https://newatlas.com/acer-aspire-r7/27398/.
(Continued)

*Primary Examiner* — Xanthia C Cunningham
(74) *Attorney, Agent, or Firm* — HPI Patent Department

(57) ABSTRACT

Examples disclosed herein provide a computing device. One example computing device includes a base member, a support member rotatably connected to the base member at a first end of the support member, via a fixed shaft around a first axis of rotation, and a display member rotatably connected at a second end of the support member opposite the first end, around a second axis of rotation that is parallel to the first axis of rotation. The computing device includes a linking mechanism disposed within the support member.

15 Claims, 6 Drawing Sheets

(52) U.S. Cl.
CPC .......... *G06F 1/1618* (2013.01); *G06F 1/1643* (2013.01); *G06F 1/1679* (2013.01); *F16M 13/005* (2013.01)

(56) References Cited

U.S. PATENT DOCUMENTS

| | | | |
|---|---|---|---|
| 6,366,935 B2 | 4/2002 | Hawkins et al. | |
| 6,532,147 B1* | 3/2003 | Christ, Jr. .............. | G06F 1/1615 248/917 |
| 6,961,234 B2 | 11/2005 | Tanaka et al. | |
| 7,184,263 B1 | 2/2007 | Maskatia | |
| 7,239,505 B2 | 7/2007 | Keely | |
| 7,413,152 B1* | 8/2008 | Chen ...................... | F16M 11/10 16/233 |
| 7,578,490 B2* | 8/2009 | Kim ...................... | F16M 11/105 248/138 |
| 8,290,549 B2* | 10/2012 | Reeves ............... | H04M 1/0216 455/575.1 |
| 8,769,772 B2* | 7/2014 | Griffin ................ | H04M 1/0216 16/354 |
| 9,261,906 B2* | 2/2016 | Arima ................... | G06F 1/1637 |
| 9,645,659 B2* | 5/2017 | Yang ....................... | G06F 3/041 |
| 2002/0145847 A1* | 10/2002 | Crosby .................. | F16M 11/10 361/679.02 |
| 2004/0169995 A1 | 9/2004 | Ghosh et al. | |
| 2004/0203994 A1 | 10/2004 | Wong et al. | |
| 2005/0128695 A1 | 6/2005 | Han | |
| 2005/0268429 A1* | 12/2005 | Akiyama ............... | G06F 1/162 16/221 |
| 2006/0038795 A1 | 2/2006 | Lee | |
| 2007/0058329 A1* | 3/2007 | Ledbetter ............... | F16M 11/10 361/679.06 |
| 2008/0094792 A1* | 4/2008 | Chen ..................... | G06F 1/1616 361/679.06 |
| 2010/0299873 A1* | 12/2010 | Song ..................... | G06F 1/1624 16/236 |
| 2011/0194238 A1* | 8/2011 | Song ..................... | G06F 1/1616 361/679.08 |
| 2012/0188701 A1 | 7/2012 | Lu et al. | |
| 2014/0029189 A1* | 1/2014 | Chang .................... | G06F 1/1662 361/679.11 |
| 2014/0043736 A1* | 2/2014 | Onda .................... | H05K 5/0217 361/679.01 |
| 2014/0097316 A1* | 4/2014 | Hsu ........................ | F16M 11/10 248/351 |
| 2014/0118929 A1 | 5/2014 | Leung et al. | |
| 2014/0130303 A1 | 5/2014 | Liao et al. | |
| 2014/0139987 A1* | 5/2014 | Onda ........................ | G06F 1/16 361/679.02 |
| 2014/0321038 A1* | 10/2014 | Park ...................... | G06F 1/1681 361/679.09 |
| 2016/0252927 A1* | 9/2016 | Senatori .................. | G06F 1/162 361/679.27 |

OTHER PUBLICATIONS

J Lee, "Samsung Ativ Q Packs Android and Windows 8 Into a Laptop/tablet with 3200 X 1800 Pixel Screen," Jun. 20, 2013, http://www.wirefresh.com/samsung-ativ-q-packs-android-and-windows-8-into-a-laptoptablet-with-3200-x-1800-pixel-screen/.

James Lu, "Sony Vaio Dup 11—Blurring the Line Between Tablet and Notebook." Dec. 12, 2012, https://www.hardwarezone.com.sg/review-sony-vaio-duo-11-blurring-line-between-tablet-and-notebook.

AJ, "The Aspire R7 is Acer's Star Trek into Darkness Laptop," May 5, 2013, http://laptopreviews.com/the-aspire-r7-is-acers-star-trek-into-darkness-laptop-2013-05.

David LeClair, "Acer's Ezel hinge system debuts in Aspsire R7," May 6, 2013, https://newatlas.com/acer-aspire-r7/27398/.

J Lee, "Samsung Ativ Q Packs Android and Windows 8 Into a Laptop/tablet with 3200 X 1800 Pixel Screen,"Jun. 20, 2013, http:/www.wirefresh.com/samsung-ativ-q-packs-android-and-windows-8-into-a-1aptoptablet-with-3200-x-1800-pixel-screen/.

James L, "Sony Vaio Duo 11-Blurring the Line Between Tablet and Notebook," Dec. 12, 2012, https//www.hardwarezone.com.sg/review-sony-vaio-duo-11-blurring-line-between-tablet-and-notebook.

* cited by examiner

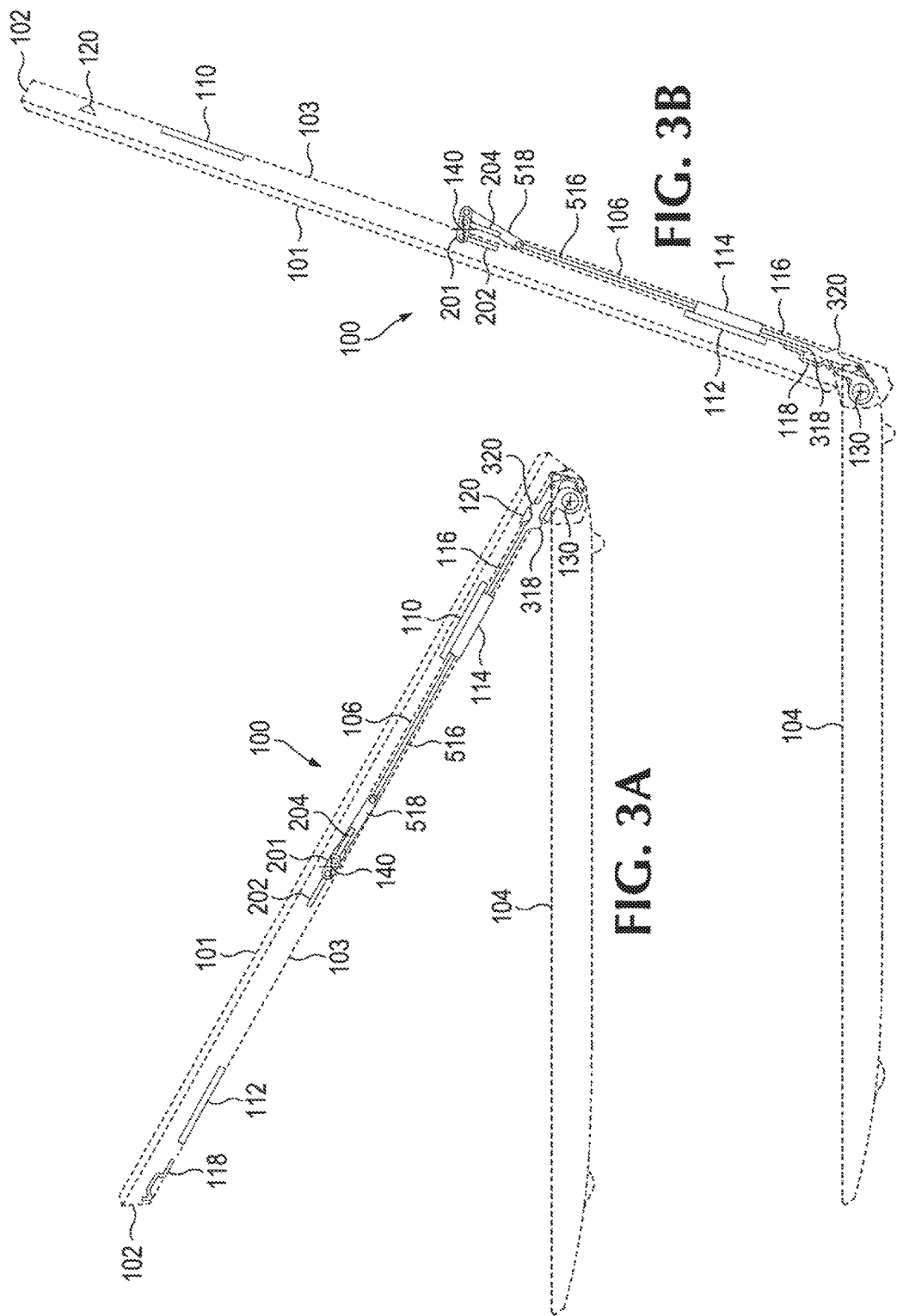

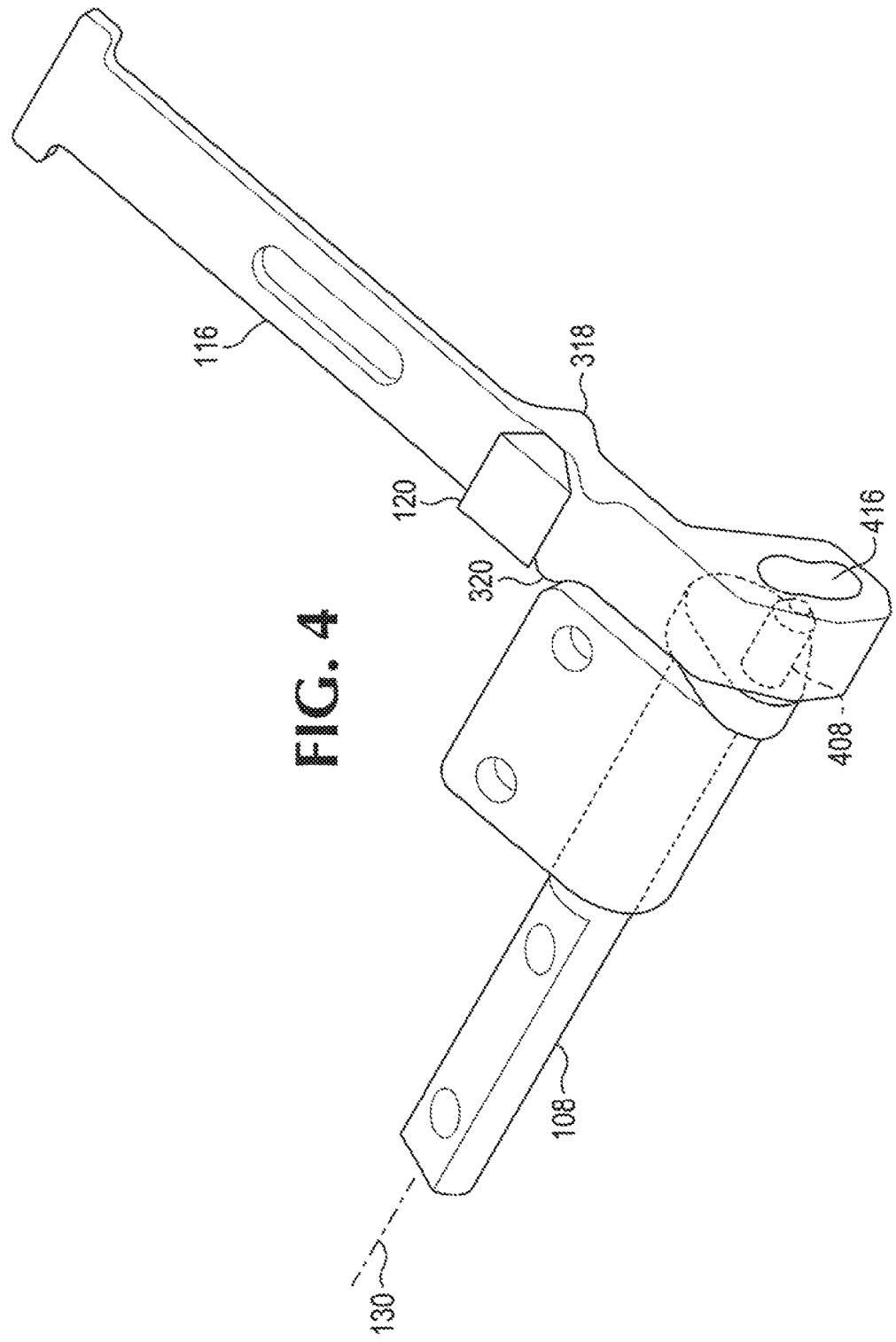

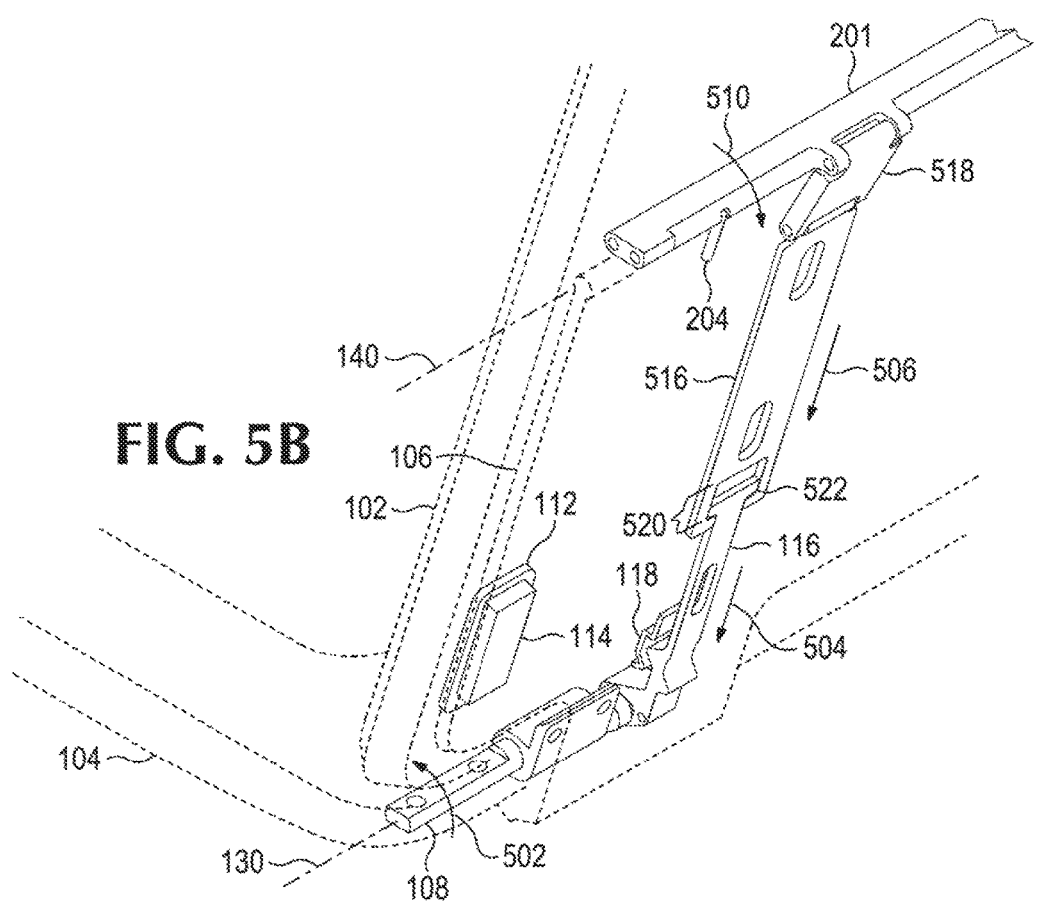

LINKING MECHANISM FOR A COMPUTING DEVICE WITH A ROTATABLE DISPLAY MEMBER

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end via one or more hinges, for example. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

BRIEF DESCRIPTION OF THE DRAWINGS

FIGS. 3A-B illustrate various operation modes of the computing device, as examples;

FIG. 4 illustrates components of the computing device, as an example; and

FIGS. 5A-B illustrate the transition of the computing device from the laptop operation mode, as an example.

DETAILED DESCRIPTION

Notebook computers may include a feature that allows the device to be "converted" from one style of use to at least another style of use. For example, a notebook computer may be converted from a laptop operation mode, where the touchpad and keyboard is used as input, to a tablet operation mode, where the viewable display is used for both viewing and input. Such devices that serve this dual purpose may be called convertible laptops. Many form factors exist for convertible laptops.

Examples disclosed herein provide a form factor for a convertible laptop including a mechanism that allows the display member to flip over when operating the laptop in tablet mode. For example, from laptop mode, the display member may be flipped over via the mechanism to operate the viewable display of the laptop as a tablet. As a result of flipping the display member over, the display member and base member may be collapsed against each other in an open, folded position. In this open, folded position, the touchpad and keyboard of the base member may be covered by the back surface of the display member. As an example, components of the mechanism may allow for the smooth transition of the laptop between various operation modes, such as laptop mode and tablet mode, as will be further discussed.

Figure 1:
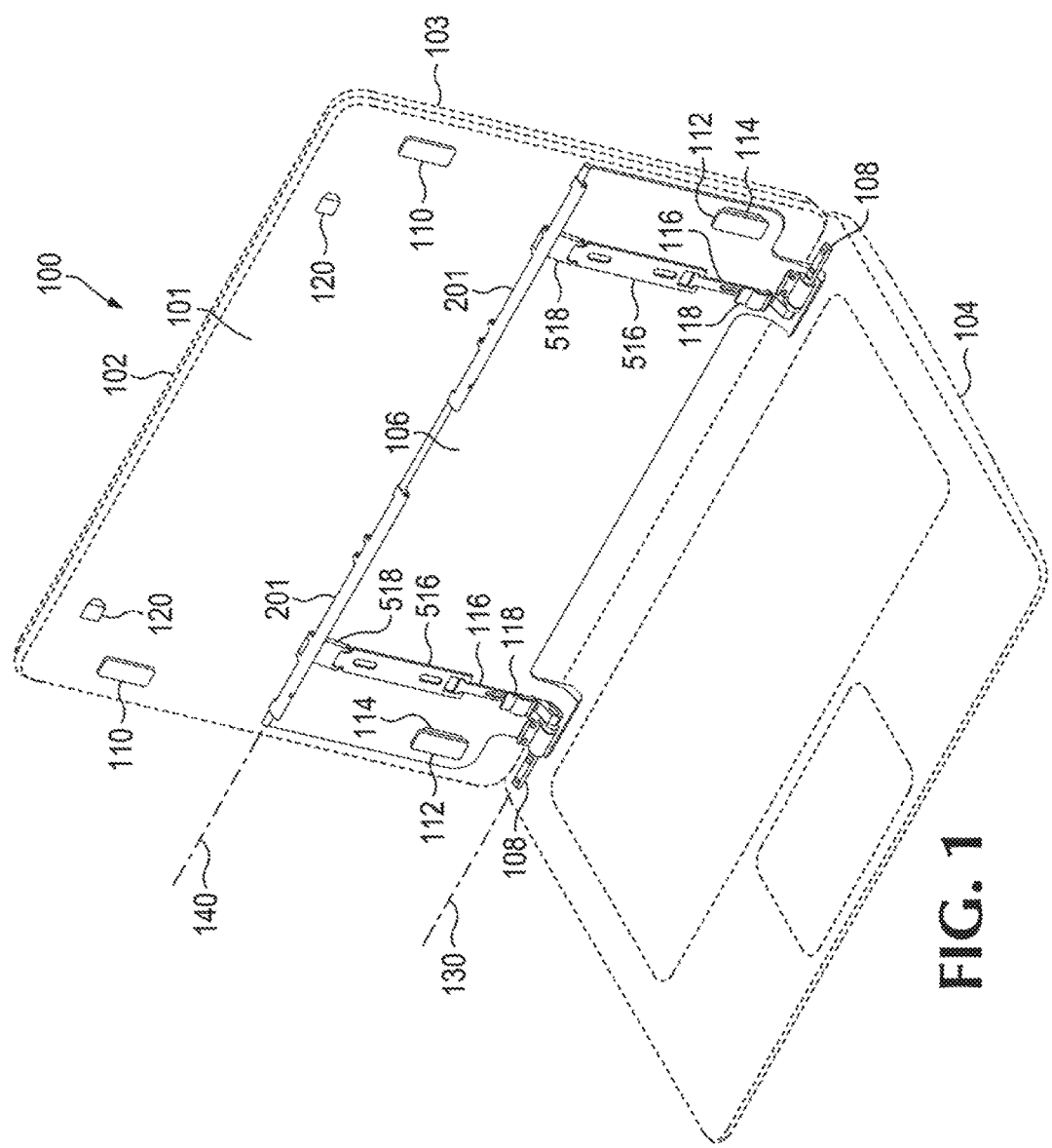
FIG. 1 illustrates a computing device in a laptop operation mode, as an example.

With reference to the figures, FIG. 1 illustrates a computing device 100 in a laptop operation mode, as an example. The device 100 includes a display member 102 and a base member 104 that are joined together via a support member 106 (e.g., see FIG. 2). The base member 104 includes a top surface that may include input means for operation by a user, such as a keyboard and/or a touchpad. The display member 102 includes a display surface 101 and a back surface 103 opposite the display surface 101. As an example, the display surface 101 may be used for viewing the video output of the laptop 100, and include input means for operation by a user, such as a touchscreen.

Referring to FIG. 1, the support member 106 may be rotatably connected to the base member 104 via a shaft 108 at a first end of the support member 106. As an example, the shaft 108 may be fixed within the base member 104, and the support member 106 may be rotatably connected to the base member 104 around a first axis of rotation 130. The display member 102 may be rotatably connected at a second end of the support member 106 opposite the first end (e.g., see FIG. 2). As an example, the display member 102 may be rotatably connected to the support member 106 around a second axis of rotation 140 that is parallel to the first axis of rotation 130.

As an example, the display member 102 may be connected to the second end of the support member 106 via hinges having two pivot points. A first pivot point of the hinges may be attached to the back surface 103 of the display member 102, and a second pivot point of the hinges may be attached to the support member 106. The two pivot points may collectively make the second axis of rotation 140. As illustrated in FIG. 1, the display member 102 may form an angle with respect to the base member 104, which may be an appropriate angle for the device 100 to be operated in laptop mode where, for example, the touchpad and/or keyboard is used as input.

When a user operates a convertible laptop in its various modes, it is desirable for the laptop to feel sturdy and rigid. For example, when the user operates the laptop in laptop mode by setting the display member at an appropriate viewing angle, it is not desirable for the display member to fall forwards or backwards as the user operates the laptop. Referring to FIG. 1, the support member 106 may be rotatably connected to the base member 104 via friction hinges that, for example, provide friction for resisting a torque provided by a user while operating the computing device 100. The friction hinges, rotating around the first axis of rotation 130 via the shaft 108, may allow for the display member 102 to be viewed at a variety of viewing angles. As an example, the friction hinges may support the display member 102 at any desired open angle with sufficient resistance to allow, for example, touch screen computing.

FIGS. 3A-B illustrate various operation modes of the computing device 100, as examples. As mentioned above, the display member 102 may be rotatably connected at an end of the support member 106. As an example, the pivot between the display member 102 and the support member 106 may allow for the display member 102 to pivot a full 180 degrees. Referring to FIG. 3A, the display member 102 may pivot around the support member 106 to operate in a tablet operation mode. Although it is not illustrated, while in tablet operation mode, the display member 102 and base member 104 may be in a parallel orientation and collapsed against each other in an open, folded position. In this open, folded position, the touchpad and keyboard of the base member 104 may be covered by the back surface 103 of the display member 102.

As an example, the display member 102 may include magnetic members 110 to magnetically couple with magnetic members 114 disposed within the support member 106, when the display member 102 is to be placed within proximity of the support member 106 to operate the computing device in the tablet mode (e.g., a second operation mode). The magnetic members 110, 114 may be arranged to produce magnetic fields that cooperate with each other to generate a magnetic attractive force that attaches the display member 102 and the support member 106 together in a mating engagement. Properties of the magnetic members that may be controlled include, but are not limited to, field strength and magnetic polarity. The arrangement of the magnetic members 110, 114 may vary. As an example, the magnetic members 110, 114 may be disposed on either end of the display member 102 and the support member 106, respectively, as illustrated in FIG. 1.

This magnetic coupling may allow for the display member 102 to remain fixed to the support member 106 until a sufficient force is applied to overcome the magnetic coupling. As will be further described, the support mechanism 106 may include a mechanism 116 disposed within the support mechanism 106 for overcoming the magnetic coupling between magnetic members 110, 114.

Referring to FIG. 3B, the display member 102 may pivot around the support member 106 to operate in a laptop operation mode (also illustrated in FIG. 1). As an example, the display member 102 may include magnetic members 112 to magnetically couple with the magnetic members 114 disposed within the support member 106, when the display member 102 is to be placed within proximity of the support member 106 to operate the computing device in the laptop mode (e.g., a first operation mode). This magnetic coupling may allow for the display member 102 to remain fixed to the support member 106 until a sufficient force is applied to overcome the magnetic coupling. The arrangement of the magnetic members 112, 114 may vary. As an example, the magnetic members 112, 114 may be disposed on either end of the display member 102 and the support member 106, respectively, as illustrated in FIG. 1. As will be further described, the mechanism 116 disposed within the support mechanism 106 may be used for overcoming the magnetic coupling between magnetic members 112, 114.

Referring back to FIG. 2, the support member 106 may include the mechanism 116 disposed within the support member 106 and rotatably connected to the base member 104 via the shaft 108, around the first axis of rotation 130. As an example, the mechanism 116 may include a feature 216 (e.g., a first feature) to overcome the magnetic coupling between the magnetic members 114 disposed within the support member 106 and the magnetic members (110 or 112) disposed within the display member 102, when the computing device 100 is to change between operation modes (e.g., between laptop and tablet modes). As an example, the feature 216 may include a tab 318 on one side and a tab 320 on a side opposite from tab 318 (e.g., see FIGS. 3A-B). Tab 318 may be used to overcome the magnetic coupling between the magnetic members 114 and the magnetic members 112 when the computing device 100 is to change from laptop mode to tablet mode (e.g., see FIGS. 3B and 5A). Similarly, tab 320 may be used to overcome the magnetic coupling between the magnetic members 114 and the magnetic members 110 when the computing device 100 is to change from tablet mode to laptop mode (e.g., see FIG. 3A).

Figure 2:
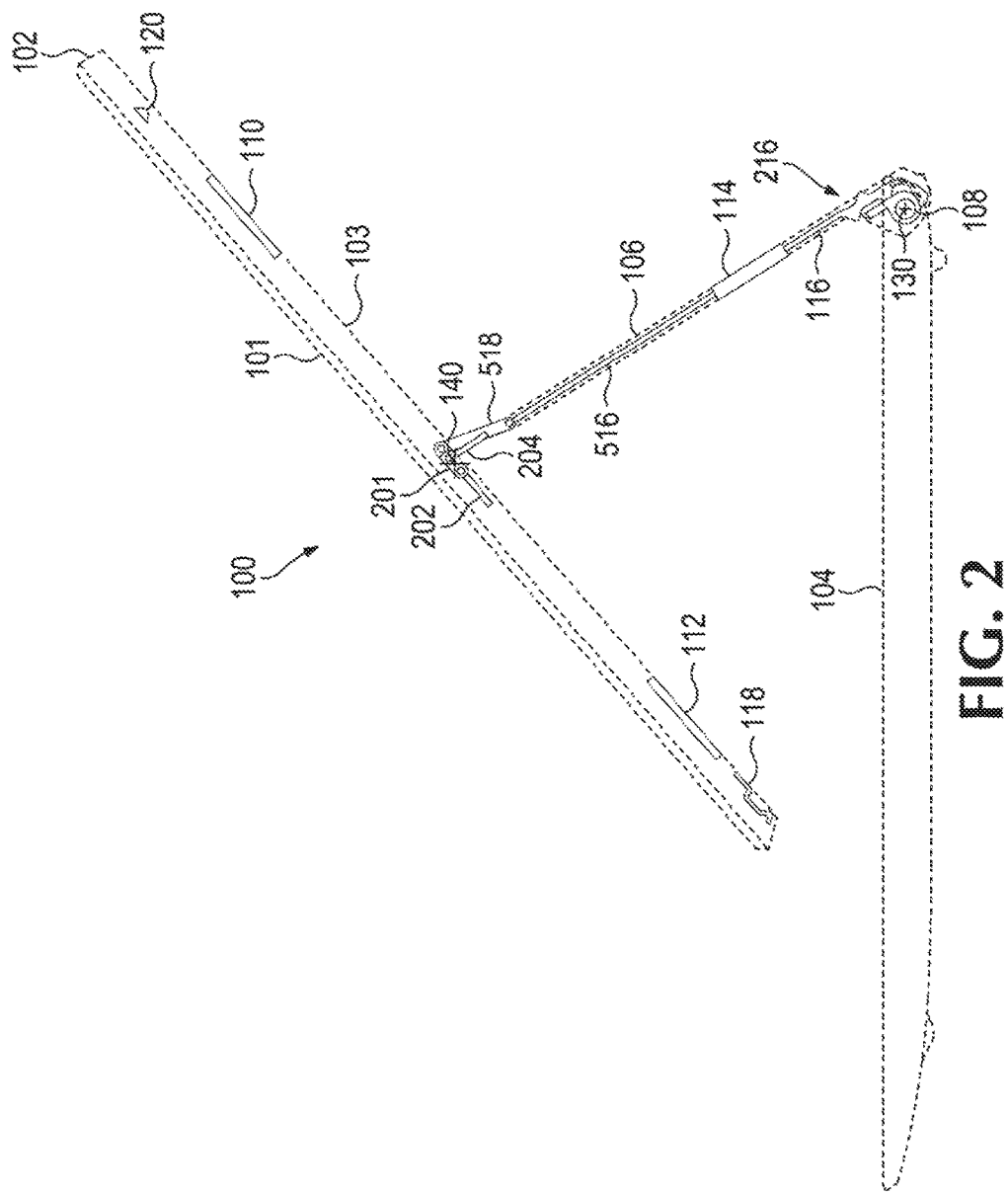
FIG. 2 illustrates the computing device in another operation mode, as an example.

As an example, a spring may be connected to the display member 102, the support member 106, or a combination thereof. The spring may enable automatic rotation of the display member 102 with respect to the support member 106 when the magnetic coupling between magnetic members 114 and magnetic members (110 or 112) is overcome. As an example, the spring may bias the display member 102 to have a neutral position near perpendicular to the support member 106, as illustrated in FIG. 2. The spring may be, for example, a compression spring, a torsion spring, etc. As an example, the spring may be a torsion link 201 connecting the display member 102 and the support member 106. The torsion link 201 may include a torsion spring 202 connected to the display member 102, and a torsion spring 204 connected to the support member 106. As described above, the display member 102 may be connected to the support member 106 via hinges having two pivot points. As an example, torsion spring 202 may rotate around the first pivot point, and torsion spring 204 may rotate around the second pivot point as illustrated in FIG. 2.

As the display member 102 pivots around the support member 106, the forces provided by the torsion springs 202, 204 may change to bias the display member 102 to the neutral position illustrated in FIG. 2. The forces provided by the torsion springs 202, 204 to bias the display member to the neutral position may be less than the magnetic force coupling magnetic members 114 and magnetic members (110 or 112), allowing for the magnetic members to remain magnetically coupled to each other. The arrangement of the torsion link 201 may vary. As an example, the computing device 100 may include two torsion links 201, as illustrated in FIG. 1. However, the computing device 100 may include more or less torsion links 201.

FIG. 4 illustrates a closeup of the mechanism 116 and the friction hinge, rotating around the first axis of rotation 130 via shaft 108, as an example. The mechanism 116 may include a slot 416. A pin 408, part of shaft 108, may traverse the slot 416 when the computing device 100 is to change between operation modes, such as when the display member 102 is opened and closed between laptop and tablet modes. As an example, the slot 416 may be irregularly shaped wherein, as the pin 408 of the shaft 108 is to traverse the slot 416, the mechanism 116 may traverse coplanar with the support member 106. As an example, the slot 416 of the mechanism 116 may have various profiles for allowing the mechanism 116 to traverse coplanar with the support member 106 as the computing device 100 is changed between first and second operation modes (e.g., laptop and tablet modes).

Referring back to FIG. 3A, as the computing device 100 is transitioned from tablet mode, the mechanism 116 may traverse upwards, coplanar with the support member 106, as the display member 102 is opened. As an example, the display member 102 may include a feature 120 (e.g., a bump-out feature on the display member 102) to come in contact with tab 320 of feature 216 to overcome the magnetic coupling between the magnetic members 114 disposed within the support member 106 and the magnetic members 110 disposed within the display member 102, when the computing device 100 is to change from tablet mode to laptop mode.

As the mechanism 116 traverses upwards, the tab 320 may make contact with feature 120. As the mechanism 116 continues to traverse upwards while the display member 102 is opened, a sufficient force may be created to overcome the magnetic coupling between magnetic members 110, 114. Overcoming the magnetic coupling may allow for a smooth transition from tablet mode to another operation mode, such as laptop mode. In addition, the torsion link 201 (illustrated in FIG. 2) may contribute towards the smooth transition by biasing the display member 102 to the neutral position.

Figure 5A:
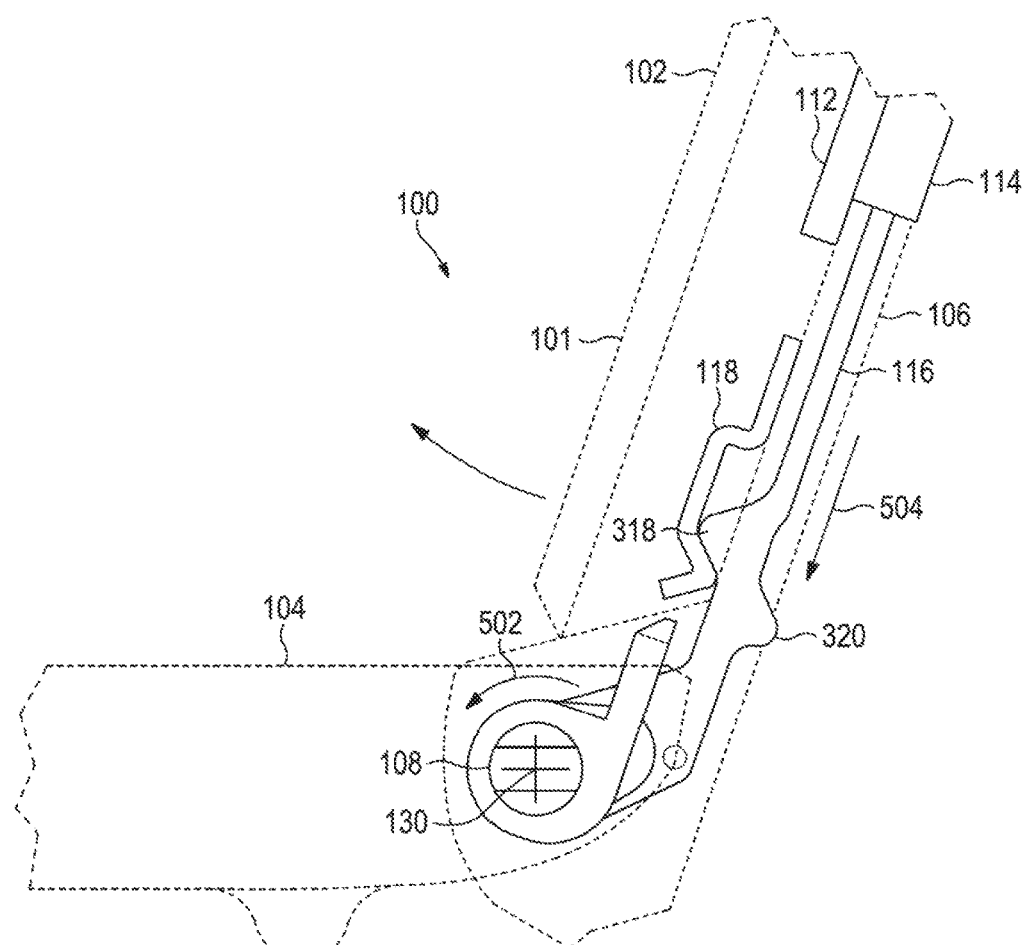

FIGS. 5A-B illustrate the transition of the computing device 100 from the laptop operation mode, as an example. As will be further described, the display member 102 may include a feature 118 to come in contact with tab 318 of feature 216 in order to overcome the magnetic coupling between the magnetic members 114 disposed within the support member 106 and the magnetic members 112 disposed within the display member 102, when the computing device 100 is to change from a first operation mode to a second operation mode (e.g., from laptop mode to tablet mode). As the display member 102 is closed from laptop mode (e.g., Indicated by arrow 502), the mechanism 116 may traverse downwards (indicated by arrow 504), coplanar with the support member 106, as described above. As the mechanism 116 traverses downwards, the tab 318 may make contact with a recessed bump or tab of feature 118, as illustrated. As the mechanism 116 continues to traverse downwards while the display member 102 is closed, a sufficient force may be created to overcome the magnetic coupling between magnetic members 112, 114.

As an example, the magnetic members 114 disposed within the support member 106 may include alternating-pole magnets that provide a force profile that drops off steeply with distance, so that a slight distance may allow for the magnetic coupling between magnetic members 112, 114 to be overcome. Overcoming the magnetic coupling may allow for a smooth transition from laptop mode to another operation mode, such as tablet mode. In addition, the torsion link 201 (illustrated in FIG. 2) may contribute towards the smooth transition by biasing the display member 102 to the neutral position.

As an example, mechanism 116 (e.g., a first mechanism) may be part of a linking mechanism, linking the rotation of the support member 106 around the first axis of rotation 130 with the rotation of the display member 102 around the second axis of rotation 140. By linking the rotations around both axes of rotation 130, 140, the linking mechanism may allow for the smooth transition of the computing device 100 between various operation modes, such as from laptop operation mode to tablet operation mode, as will be further discussed.

Referring to FIG. 5B, the linking mechanism may include first mechanism 116 and second mechanism 516. Referring back to FIG. 4, the first mechanism 116 is rotatably connected to the base member 104 via the shaft 108. The first mechanism 116 may include a slot 416 that is irregularly shaped. As described above, when the display member 102 is opened and closed between laptop and tablet modes, the first mechanism 116 may traverse coplanar with the support member 106 as the pin 408 of the shaft 108 traverses the slot 416. Referring back to FIG. 5A, as the display member 102 is closed from laptop mode (e.g., indicated by arrow 502), the first mechanism 116 may traverse downwards (indicated by arrow 504), coplanar with the support member 106. As the first mechanism 116 traverses downwards, the first mechanism 116 may engage the second mechanism 516 at 522, as illustrated in FIG. 5B.

The first mechanism 116 may have a clearance 520 to traverse downwards prior to engaging the second mechanism 516 at 522. As an example, the clearance 520 may be an appropriate amount for the first mechanism 116 to overcome the magnetic coupling between magnetic members 114 and magnetic members 112, as described above with reference to FIG. 5A. Once the magnetic coupling has been overcome, the first mechanism 116 may engage the second mechanism 516 at 522, in order to link the rotation of the support member 106 around the first axis of rotation 130 (indicated by arrow 502 in FIG. 5A) with the rotation of the display member 102 around the second axis of rotation 140 (indicated by arrow 510 in FIG. 5B).

Referring to FIG. 5B, the second mechanism 516 may be connected to the second axis of rotation 140 (i.e., the axis where the display member 102 is rotatably connected to the support member 106) via a dual axis link 518. As illustrated, one end of the dual axis link 518 may be connected to the second mechanism 516, and another end of the dual axis link 518 may be rotatably connected around the second axis of rotation 140. As an example, the second mechanism 516 may be connected directly to the second axis of rotation 140 (not illustrated). Upon engaging the second mechanism 516 at 522, as the first mechanism 116 traverses downwards (indicated by arrow 504 in FIG. 5A), the second mechanism 516 may also traverse downwards (indicated by arrow 506). As a result, the linking mechanism, including the first and second mechanisms 116, 516, may traverse coplanar with the support member 106, as the pin 408 of the shaft 108 is to traverse the slot 416 of the first mechanism 116. Once the first mechanism 116 engages the second mechanism 516 at 522, the second mechanism 516 may induce the rotation of the display member around the second axis of rotation 140, as the support member 106 is rotated around the first axis of rotation.

As one end of the first mechanism 116 is rotatably connected to the shaft 108 around the first axis of rotation 130, and one end of the second mechanism 516 is connected to the second axis of rotation 140 (e.g., via the dual axis link 518), the rotation around the first axis of rotation 130 may be linked with the rotation around the second axis of rotation 140. As a result, the linking mechanism may allow for the smooth transition of the computing device 100 between various operation modes, such as from laptop operation mode to tablet operation mode. As an example, the linking mechanism may prevent the display member 102 from crashing with the base member 104 once the magnetic coupling between magnetic members 112, 114 is overcome. As the linking mechanism links rotations between the first and second axes of rotation 130, 140, the linking mechanism may lock the rotation of the support member 106 around the first axis of rotation 130 until the display member 102 is rotated around the second axis of rotation 140. For example, if a resistance is placed on the display member 102, preventing it from rotating as the computing device 100 is transitioned from laptop mode to tablet mode, rotation around the first axis of rotation 130 may be locked until rotation around the second axis of rotation 140 is initiated.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
   a base member;
   a support member rotatably connected to the base member at a first end of the support member, via a fixed shaft around a first axis of rotation;
   a display member rotatably connected at a second end of the support member opposite the first end, around a second axis of rotation that is parallel to the first axis of rotation; and
   a linking mechanism disposed within the support member, wherein the linking mechanism is to traverse coplanar with the support member, wherein, when the computing device is to change from a first operation mode to a second operation mode, the linking mechanism is to link rotation of the support member around the first axis of rotation with rotation of the display member around the second axis of rotation.

2. The computing device of claim 1, wherein, when the computing device is to change from the first operation mode to the second operation mode, the linking mechanism is to lock the rotation of the support member around the first axis of rotation until the display member is to be rotated around the second axis of rotation.

3. The computing device of claim 1, wherein the linking mechanism comprises:
   a first mechanism rotatably connected to the base member via the shaft, wherein the first mechanism includes a slot that is irregularly shaped, and wherein a pin of the shaft is to traverse the slot when the computing device is to change between the first and second operation modes; and
   a second mechanism, wherein the first mechanism is to engage the second mechanism when the computing device is to change from the first operation mode to the second operation mode.

4. The computing device of claim 3, wherein, when the first mechanism is to engage the second mechanism, the second mechanism is to induce the rotation of the display member around the second axis of rotation as the support member is rotated around the first axis of rotation.

5. The computing device of claim 4, wherein the linking mechanism comprises a dual axis link, wherein a first end of the dual axis link is connected to the second mechanism, and a second end of the dual axis link opposite the first end is rotatably connected around the second axis of rotation, and wherein the second mechanism is to induce the rotation of the display member around the second axis of rotation via the dual axis link.

6. The computing device of claim 3, wherein, as the pin of the shaft is to traverse the slot, the linking mechanism is to traverse coplanar with the support member.

7. The computing device of claim 1, wherein the first operation mode corresponds to a laptop operation mode, wherein the second operation mode corresponds to a tablet operation mode, and wherein the display member and the base member are in a parallel orientation when the computing device is in the second operation mode.

8. A computing device comprising:
   a base member;
   a support member rotatably connected to the base member at a first end of the support member, via a fixed shaft around a first axis of rotation;
   a display member rotatably connected at a second end of the support member opposite the first end, around a second axis of rotation that is parallel to the first axis of rotation; and
   a linking mechanism disposed within the support member, wherein the linking mechanism is to traverse coplanar with the support member, wherein, when the computing device is to change from a first operation mode to a second operation mode, the linking mechanism is to lock the rotation of the support member around the first axis of rotation until the display member is to be rotated around the second axis of rotation.

9. The computing device of claim 8, wherein, when the computing device is to change from the first operation mode to the second operation mode, the linking mechanism is to link rotation of the support member around the first axis of rotation with rotation of the display member around the second axis of rotation.

10. The computing device of claim 8, wherein the linking mechanism comprises:
    a first mechanism rotatably connected to the base member via the shaft, wherein the first mechanism includes a slot that is irregularly shaped, and wherein a pin of the shaft is to traverse the slot when the computing device is to change between the first and second operation modes; and
    a second mechanism, wherein the first mechanism is to engage the second mechanism when the computing device is to change from the first operation mode to the second operation mode.

11. The computing device of claim 10, wherein, when the first mechanism is to engage the second mechanism, the second mechanism is to induce the rotation of the display member around the second axis of rotation as the support member is rotated around the first axis of rotation.

12. The computing device of claim 11, wherein the linking mechanism comprises a dual axis link, wherein a first end of the dual axis link is connected to the second mechanism, and a second end of the dual axis link opposite the first end is rotatably connected around the second axis of rotation, and wherein the second mechanism is to induce the rotation of the display member around the second axis of rotation via the dual axis link.

13. A computing device comprising:
    a base member;
    a support member rotatably connected to the base member at a first end of the support member, via a fixed shaft around a first axis of rotation;
    a display member rotatably connected at a second end of the support member opposite the first end, around a second axis of rotation that is parallel to the first axis of rotation; and
    a linking mechanism disposed within the support member, wherein the linking mechanism is to traverse coplanar with the support member, wherein the linking mechanism comprises:
       a first mechanism rotatably connected to the base member via the shaft, wherein the first mechanism includes a slot that is irregularly shaped, and wherein a pin of the shaft is to traverse the slot when the computing device is to change between a first operation mode and a second operation mode; and
       a second mechanism, wherein the first mechanism is to engage the second mechanism when the computing device is to change from the first operation mode to the second operation mode.

14. The computing device of claim 13, wherein, when the computing device is to change from the first operation mode to the second operation mode, the linking mechanism is to link rotation of the support member around the first axis of rotation with rotation of the display member around the second axis of rotation.

15. The computing device of claim 13, wherein, when the first mechanism is to engage the second mechanism, the second mechanism is to induce the rotation of the display member around the second axis of rotation as the support member is rotated around the first axis of rotation.

* * * * *